(No Model.)
C. R. BEHNKE.
TOOL HOLDER FOR THREAD CUTTERS.
No. 521,255. Patented June 12, 1894.
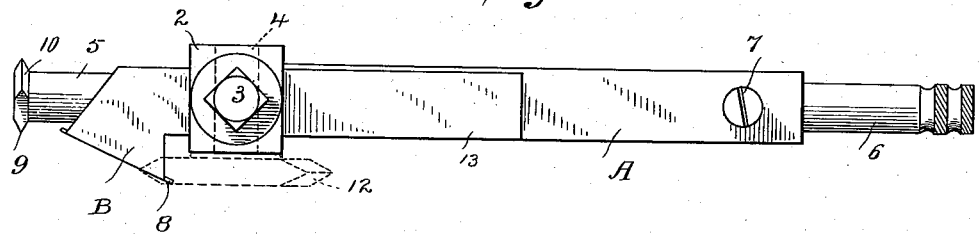
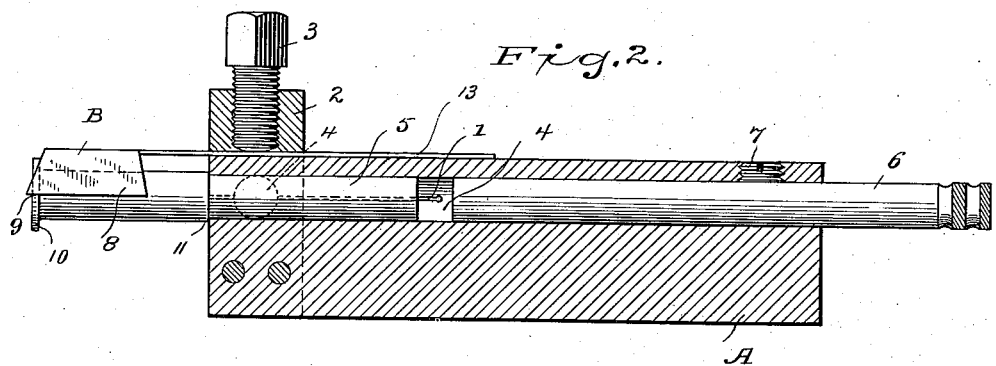
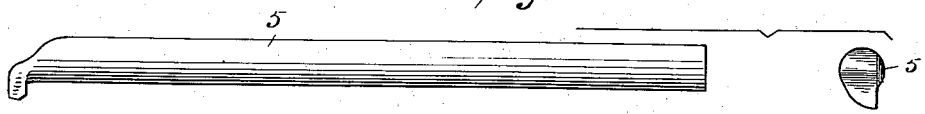
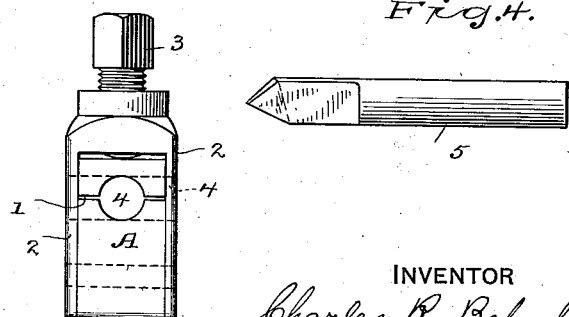
WITNESSES
INVENTOR
Charles R. Behnke

UNITED STATES PATENT OFFICE.

CHARLES R. BEHNKE, OF BRIDGEPORT, CONNECTICUT.

TOOL-HOLDER FOR THREAD-CUTTERS.

SPECIFICATION forming part of Letters Patent No. 521,255, dated June 12, 1894.

Application filed September 25, 1893. Serial No. 486,421. (No model.)

*To all whom it may concern:*

Be it known that I, CHARLES R. BEHNKE, a citizen of the United States, residing at Bridgeport, in the county of Fairfield and State of Connecticut, have invented certain new and useful Improvements in Tool-Holders for Thread-Cutters; and I do hereby declare the following to be a full, clear, and exact description of the invention, such as will enable others skilled in the art to which it appertains to make and use the same.

My invention has for its object to provide an implement adapted for general use in metal working but more especially adapted for cutting threads as in making threaded gages and threaded dies, an important feature of my novel invention being that but a single tool holder is required to carry any tool that may be required for inside or outside cutting, for centering, boring, or any of the various uses to which lathe tools are applied.

With these ends in view I have devised the novel construction which I will now describe, referring by numbers and letters to the accompanying drawings, and letters forming part of this specification, in which—

Figure 1 is a plan view of my novel tool holder showing an inside thread cutter in full lines and an outside thread cutter in dotted lines, the special cutters illustrated being adapted to cut V shaped threads, and showing also the use of a special gage in setting the outside thread cutter; Fig. 2 a vertical longitudinal section the gage being in position to set the inside thread cutter, the special cutter illustrated being adapted to cut a square thread; Fig. 3 an end view of the tool holder ready to receive a tool, and Figs. 4, 5 and 6 are views illustrating tools detached, Fig. 4 illustrating an ordinary centering tool, Fig. 5 illustrating in both side elevation and end elevation a tool for cutting either a right or left hand square thread, and Fig. 6 illustrating in both side and end elevation an ordinary boring tool.

A denotes the tool holder which is adapted to carry any of the various tools used upon metal lathes, said tool holder being adapted to be held in a tool post on the cross slide of a lathe.

1 denotes a slot in the tool holder which extends inward far enough to give ample spring to clamp the tools in place.

At the forward end of the tool holder is a yoke 2 which carries a set screw 3 the point of which bears upon the top of the holder to clamp the tool in place.

The tool holder is provided with both longitudinal and transverse openings 4 in the same horizontal plane adapted to receive shanks 5 of tools.

Heretofore so far as I am aware no tool holder has been produced which would enable an operator to do all classes of work with a single set of tools. Entirely different sets of tools have been required for different classes of work and the adjustment of the tool in changing from one class of work to another has been a matter requiring the highest grade of skill and involving considerable delay and loss of time.

My present tool holder is adapted to receive all classes of tools both for inside and outside thread cutting, the tool being self centering relatively to the holder, and by means of a simple gage, the inside or outside thread cutter may be set at once without losing time by a single tentative adjustment. After the tool holder has once been made central with the lathe no further adjustment is necessary. Either inside or outside thread cutters and various other tools may be used and changed without elevating or depressing the tool holder.

6 is a stop against which the shanks of the tools abut to form a longitudinal adjustment. The stop is locked in place by a set screw 7.

B denotes a gage which is simply a plate of metal blanked out to proper shape and provided with an oblique edge 8 which is adapted to be engaged by the cutting edge 9 of an inside or an outside thread cutter to determine the position of said edge in setting it to place, and a shank 13 which is adapted to pass between the top of the holder and the yoke and to be locked in place by the set screw.

10 in Fig. 1 denotes an inside thread cutter adapted to cut a V shaped thread, and the same number in Fig. 2 an inside thread cutter adapted to cut a square thread. The mode of setting the cutting edge will be clearly understood from Fig. 2. In this figure the tool is shown as provided with a shoulder 11 which serves as a stop to limit its longitudinal movement. Ordinarily however this shoulder is not provided on the shanks of tools and the longitudinal movement of the shanks is determined by stop 6.

12, see dotted lines Fig. 1 denotes an outside thread cutter. This view clearly illustrates the manner in which this tool is used and also the manner in which it is adjusted.

Fig. 4 illustrates an ordinary centering tool and Fig. 6 an ordinary inside boring tool.

Fig. 5 illustrates a tool which when used in connection with my novel tool holder will cut either a right or a left thread. The end view in Fig. 1 shows said tool in the vertical position. This however is not the position in which it is used. If the cutting edge is inclined slightly toward the right from the vertical position it will cut a left hand thread and if it is inclined toward the left it will cut a right hand thread.

To illustrate the great saving of time from the use of my novel implement, suppose it is desired to bore a hole in a block of metal and cut an inside thread therein. As this class of work has heretofore been done different sets of tools have been required and much time has necessarily been lost in adjusting the tools.

My present invention enables me to wholly avoid loss of time in adjustment. The operator would first use the centering tool, the longitudinal adjustment of which would be determined by stop 6. This tool is self centering in the holder and is locked in position by simply tightening the set screw. If desired this tool may be used as a drill. If a larger hole is required the tool illustrated in Fig. 6 is next used to make the hole the required size. The operator then removes this tool and uses an inside thread cutter 10 to cut the thread. Gage B may be used to set the cutting edge at the most effective position, and stop 6 may be used to determine the longitudinal adjustment and to form a solid backing for the tool. Skilled operators will find it practicable to dispense with both gage and stop. In cutting an inside thread should the cutter become dulled it may be removed and sharpened, and then replaced with but slight loss of time and with perfect certainty that the tool will continue the original thread without a break.

Having thus described my invention, I claim—

1. A holder for metal working tools having a slot 1 for the purpose set forth, longitudinal and transverse openings in the same horizontal plane adapted to receive the shanks respectively of inside and outside thread cutters, and suitable means engaging the holder to cause it to clamp the shank of the tool.

2. A holder for metal working tools having a slot 1 for the purpose set forth, longitudinal and transverse openings in the same horizontal plane adapted to receive the shanks of tools, a yoke and a set screw 3 in said yoke adapted to bear on the top of the holder to cause it to clamp the shank of the tool, a stop 6 in the longitudinal opening to determine the inward movement of a tool shank and a set screw 7 to lock the stop.

3. A holder for metal working tools having a slot 1 for the purpose set forth, longitudinal and transverse openings adapted to receive shanks of tools, a yoke and a set screw in said yoke adapted to bear on the top of the holder to clamp the tool therein, a gage B having an oblique edge 8 by which the cutting edges of inside or outside thread cutters may be adjusted, and a shank adapted to pass between the yoke and the holder and to be locked in place by the set screw.

In testimony whereof I affix my signature in presence of two witnesses.

CHARLES R. BEHNKE.

Witnesses:
A. M. WOOSTER,
PEARL REYNOLDS.